(12) United States Patent
Erlingstam et al.

(10) Patent No.: US 7,815,256 B2
(45) Date of Patent: Oct. 19, 2010

(54) VEHICLE SEAT

(75) Inventors: Christer Erlingstam, Alingsås (SE); Christian Svensson, Vårgårda (SE)

(73) Assignee: Autoliv Development,AB, Vargarda (SE)

( * ) Notice: Subject to any disclaimer, the term of this patent is extended or adjusted under 35 U.S.C. 154(b) by 99 days.

(21) Appl. No.: 11/920,458

(22) PCT Filed: May 12, 2006

(86) PCT No.: PCT/SE2006/000553

§ 371 (c)(1), (2), (4) Date: Nov. 15, 2007

(87) PCT Pub. No.: WO2006/123981

PCT Pub. Date: Nov. 23, 2006

(65) Prior Publication Data

US 2009/0079242 A1    Mar. 26, 2009

(30) Foreign Application Priority Data

May 20, 2005   (GB) .................................. 0510368.4

(51) Int. Cl.
*A47C 15/00* (2006.01)
(52) U.S. Cl. .................. 297/236; 297/237; 297/484; 297/483
(58) Field of Classification Search ......... 297/236–238, 297/391, 483, 484
See application file for complete search history.

(56) References Cited

U.S. PATENT DOCUMENTS

| | | | |
|---|---|---|---|
| 2,584,481 A | | 2/1952 | Mast et al. |
| 3,866,975 A | * | 2/1975 | Fricko .......................... 297/479 |
| 4,596,420 A | * | 6/1986 | Vaidya ........................ 297/233 |
| 5,106,158 A | * | 4/1992 | Dukatz et al. ................ 297/396 |
| 5,161,855 A | * | 11/1992 | Harmon ....................... 297/238 |
| 5,265,934 A | | 11/1993 | Forget |
| 5,282,668 A | | 2/1994 | Heussner et al. |
| 5,385,384 A | * | 1/1995 | Gierman et al. ............. 297/238 |
| 5,540,479 A | * | 7/1996 | Thomas et al. .............. 297/113 |
| 5,660,437 A | * | 8/1997 | Bauer et al. ................. 297/237 |
| 5,700,054 A | * | 12/1997 | Lang ........................... 297/238 |
| 5,788,326 A | | 8/1998 | Kawade et al. |
| 5,997,083 A | | 12/1999 | Ono et al. |
| 6,082,817 A | * | 7/2000 | Muller ................... 297/216.12 |

(Continued)

FOREIGN PATENT DOCUMENTS

DE            4315479 C         5/1994

(Continued)

*Primary Examiner*—David Dunn
*Assistant Examiner*—Erika Garrett
(74) *Attorney, Agent, or Firm*—Harness, Dickey & Pierce, P.L.C.

(57) ABSTRACT

A vehicle seat (1) having a squab (2) and the backrest (3) may be provided with a child squab or booster cushion (4). Various elements are provided on the seat which may move in response to the child squab (4) being provided. A first element that may move is a guide (10) which guides part of a seat belt (7). The guide (10) moves inwardly towards the central axis (8) of the seat. Other moveable restraints may be lateral restraints (62,63) which move forwardly from the backrest of the seat to be located to either side of the torso of a child occupying the child squab (4) and head restraints (64,65) which may move forwardly from the head rest.

19 Claims, 8 Drawing Sheets

U.S. PATENT DOCUMENTS

Figure 1:
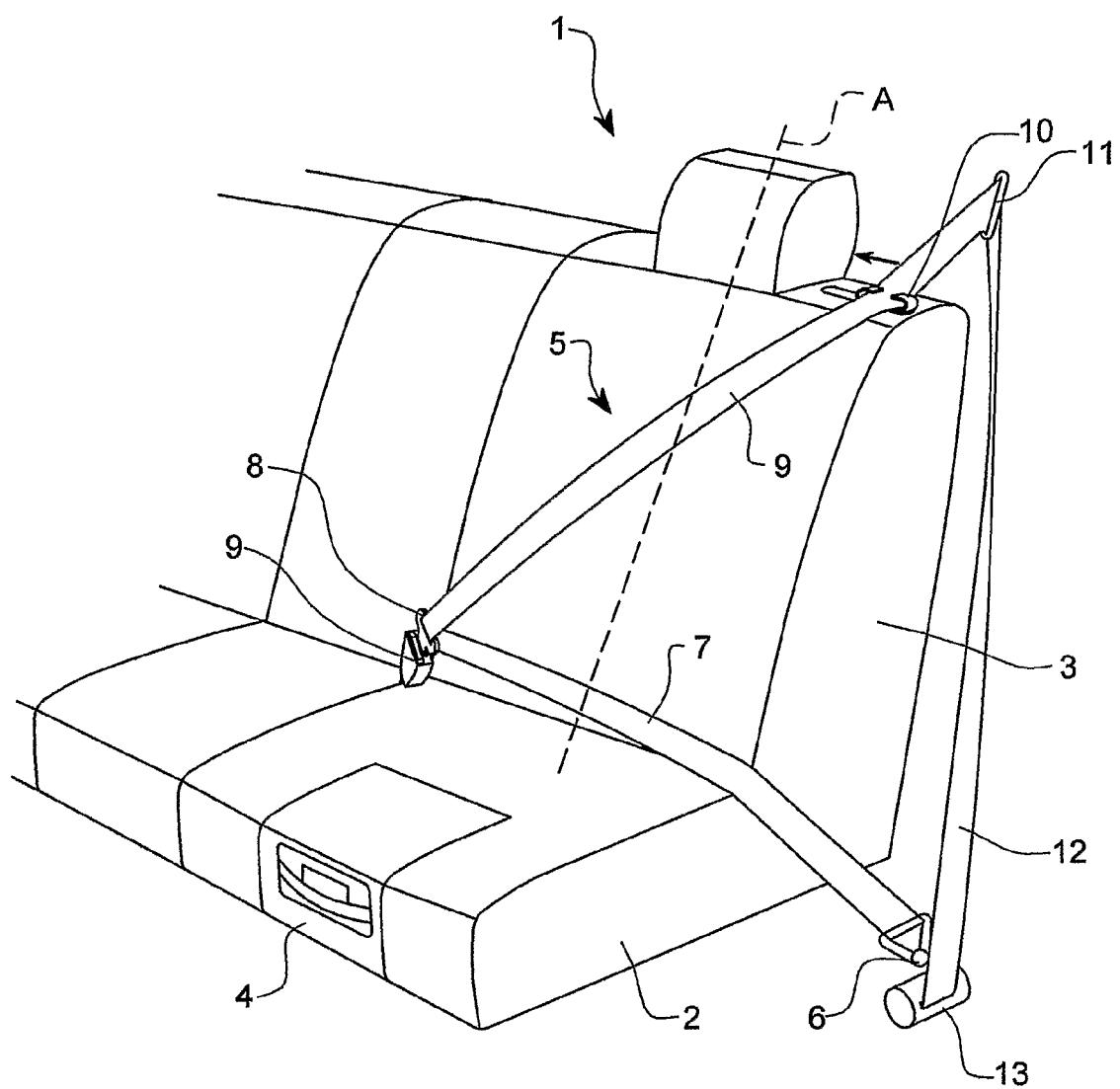

| | | |
|---|---|---|
| 6,971,718 B2 | 12/2005 | Haglund |
| 7,070,239 B1 * | 7/2006 | Ugrekhelidze et al. ...... 297/238 |
| 7,413,249 B2 * | 8/2008 | Leutert, Ruedi ............. 297/237 |
| 2005/0116516 A1 | 6/2005 | Robinson |
| 2005/0275258 A1 * | 12/2005 | Patterson et al. ............ 297/238 |
| 2008/0088164 A1 | 4/2008 | Ahlqvist et al. |

FOREIGN PATENT DOCUMENTS

| | | |
|---|---|---|
| DE | 43 40 337 A | 6/1994 |
| DE | 4404319 C | 4/1995 |
| DE | 4418587 A | 11/1995 |
| DE | 44 42 530 A1 | 6/1996 |
| DE | 196 54 205 A | 6/1998 |
| EP | 0286542 A2 | 10/1988 |
| EP | 0 593 146 A1 | 4/1994 |
| EP | 0633159 A | 1/1995 |
| EP | 0666194 | 8/1995 |
| EP | 0 803 398 A2 | 10/1997 |
| EP | 0 827 863 A3 | 3/1998 |
| FR | 2692209 A1 | 12/1993 |
| GB | 2278775 A | 12/1994 |
| GB | 2368272 A | 5/2002 |
| JP | 07-165012 A | 6/1995 |
| JP | 11-180251 A | 7/1999 |
| JP | 2000-280861 A | 10/2000 |

* cited by examiner

VEHICLE SEAT

CROSS-REFERENCE TO RELATED APPLICATIONS

This application is a 371 National Stage of International application No. PCT/SE2006/000553, filed May 12, 2006 and published in English as WO 2006/123981 A1 on Nov. 23, 2006. This application claims the benefit of GB 0510368,4, filed May 20, 2005. The disclosures of the above applications are incorporated herein by reference.

The present invention relates to a vehicle seat, and more particularly relates to a vehicle seat which may be adapted to seat a child.

Conventional safety belt arrangements which are often installed in motor vehicles are usually in the form of a three-point belt arrangement.

A three-point belt arrangement is usually formed by a single continuous belt which is fixed at one end by an anchorage to part a vehicle which is on one side of a vehicle seat, at a position which is below the level of the squab of the seat.

The belt has a first section which extends upwardly from the anchorage on said one side of the seat, over the lap of a seat occupant to a tongue which is inserted and locked into a buckle on the other side of the seat.

The three-point belt has a second section which extends diagonally upwardly from the tongue, across the torso of the seat occupant to a guide loop. The guide loop is fixed to the wall or door pillar of the motor vehicle at a position which is on the opposite side of the seat occupant to the buckle, with the guide loop being positioned above the level of the shoulder of the seat occupant.

The belt arrangement has a third section which extends downwardly from the guide loop to a retractor which is mounted to the vehicle on the same side as the guide loop, but at a position below the guide loop.

Safety requirements in modern vehicles usually require the belt fixing, buckle, guide loop and retractor to be positioned at specified distances from one another to ensure that when the safety belt is being worn by a seat occupant the first section of the belt extends over the lap of the occupant in the correct position, and more particularly the second section of the safety belt extends over the correct part of the torso and the centre of one shoulder of the occupant. The required positioning of the points of the safety belt when the safety belt is being worn are chosen such that the safety belt provides optimum protection for an average sized occupant in the event that a crash situation occurs. Such an average sized occupant is typically of average adult size, or the size and weight of a 50 percentile male dummy.

Therefore, when an average sized adult is wearing a conventional safety belt, the lap and torso parts of the safety belt extend over the occupant at the correct positions, making the safety belt both comfortable to wear, and ensuring that the safety belt offers the optimum protection to the seat occupant should a crash situation occur.

If a smaller than average sized occupant, such as a child, is seated in a vehicle and wearing a conventional safety belt of the type discussed above, the sections of the safety belt do not usually pass over the smaller occupant at the correct positions. This is most noticeably the case when a small child is seated on the vehicle seat, where the child's shoulders are at a much lower level than the shoulders of an adult seated on the same seat. In this case the second section of the safety belt extends at a high level across the child, and in some cases only extends across the very upper part of the child's torso and across the child's neck. This incorrect positioning of the second section of the safety belt on a child can potentially be very dangerous, as the second section may exert a large force on the neck of the child during a crash situation, which may injure the neck of the child.

Therefore, in an attempt to alleviate this problem the seat may be provided with a child squab, or booster cushion, which is placed above the level of the squab of the seat, to allow the child to be seated on top of the child squab at a higher level than the upper level of the squab of the seat. The child squab thus acts to raise the level of the shoulders of the child when the child is seated, so that the second section of the safety belt passes diagonally at a lower level across the torso of the child, away from the neck of the child.

Although the use of a child squab, or booster cushion, can alleviate the problem of the second section of the safety belt passing over the neck of the child, the use of such a child squab can create a different problem. This different problem results from the child squab raising the seated child so that the second section of the safety belt passes across the torso of the child at an angle which results in the second section of the safety belt extending below and to one side of the shoulders of the child. In this case, the second section of the safety belt does not pass over a shoulder of the child, and thus the safety belt is not able to restrain the child correctly. In a crash situation the child may be thrown forwardly by the forces of the crash, and as the safety belt does not pass over a shoulder of the child, the child may not be sufficiently restrained from moving upwardly and the child may be thrown "over" the second section of the safety belt and strike part of the vehicle, possibly causing injury.

A further problem with the use of a child squab or booster cushion is that the squab or booster cushion does not, of itself, provide any lateral support for a child utilising the child squab or booster cushion and in particular does not provide any lateral support for the torso of the child and does not provide any lateral support for the head of the child.

The present invention seeks to provide an improved vehicle seat.

According to this invention there is provided a vehicle seat incorporating a squab and a backrest, the seat comprising at least one restraint element which is moveably mounted relative to the backrest, the restraint element being moveable between a first position and a second position, there being a drive arrangement connected to the or each restraint element to move the element from the first position to the second position in response to the seat being provided with a child squab to accommodate a child.

In one embodiment the child squab is formed integrally with the vehicle seat, the child squab being moveable from a retracted position, in which the seat is adapted to seat an adult, to an operative position to provide said child squab in a position to accommodation a child.

Preferably the said drive arrangement moves the or each restraint element in response to movement of the child squab between said retracted position and said operative position.

In an alternative embodiment the drive arrangement is responsive to a separate child squab being provided on said seat as a booster cushion to accommodate a child.

Conveniently the seat incorporates a sensor which senses the presence of the child squab on the squab of the seat, the sensor being configured to actuate the drive arrangement.

Preferably the or each restraint element is moveable by a wire linkage system incorporating at least one Bowden cable which forms at least part of the drive arrangement.

Alternatively the or each restraint element is moveable by a drive arrangement which incorporates one or more electrically actuable elements.

Conveniently the electrically actuable elements comprise electric motors.

Preferably the or a said restraint element comprises a safety belt guide element, the safety belt guide element being moveably mounted to the backrest of the seat, to one side of the central longitudinal axis of an upper part of the backrest of the seat to guide a safety over a shoulder of an occupant of the seat, with the guide element being moveable from said first position to a second position which is closer to the central longitudinal axis of the back rest than the first position.

Conveniently the or a restraint element comprises a restraint element moveable from said first position in which the restraint element is accommodated within the backrest of the seat, to a second position in which the restraint projects from the backrest of the seat, the said restraint element being positioned to one side of the child squab.

Advantageously there are two said restraint elements accommodated within the backrest of the seat positioned on respective sides of the child squab.

Preferably the or a restraint comprises a head restraint moveably mounted to the headrest of the seat and moveable from a first position, in which the restraint is retracted, to a second position in which the restraint extends forwardly of a central part of the headrest of the seat.

Conveniently two said head restraints are provided, there being a respective one on each side of the headrest.

Advantageously the or each restraint element is associated with a first locking arrangement having a first locking member for locking the restraint element in the first position and a second locking arrangement having a second locking member for locking the restraint element in the second position.

Figure 2:
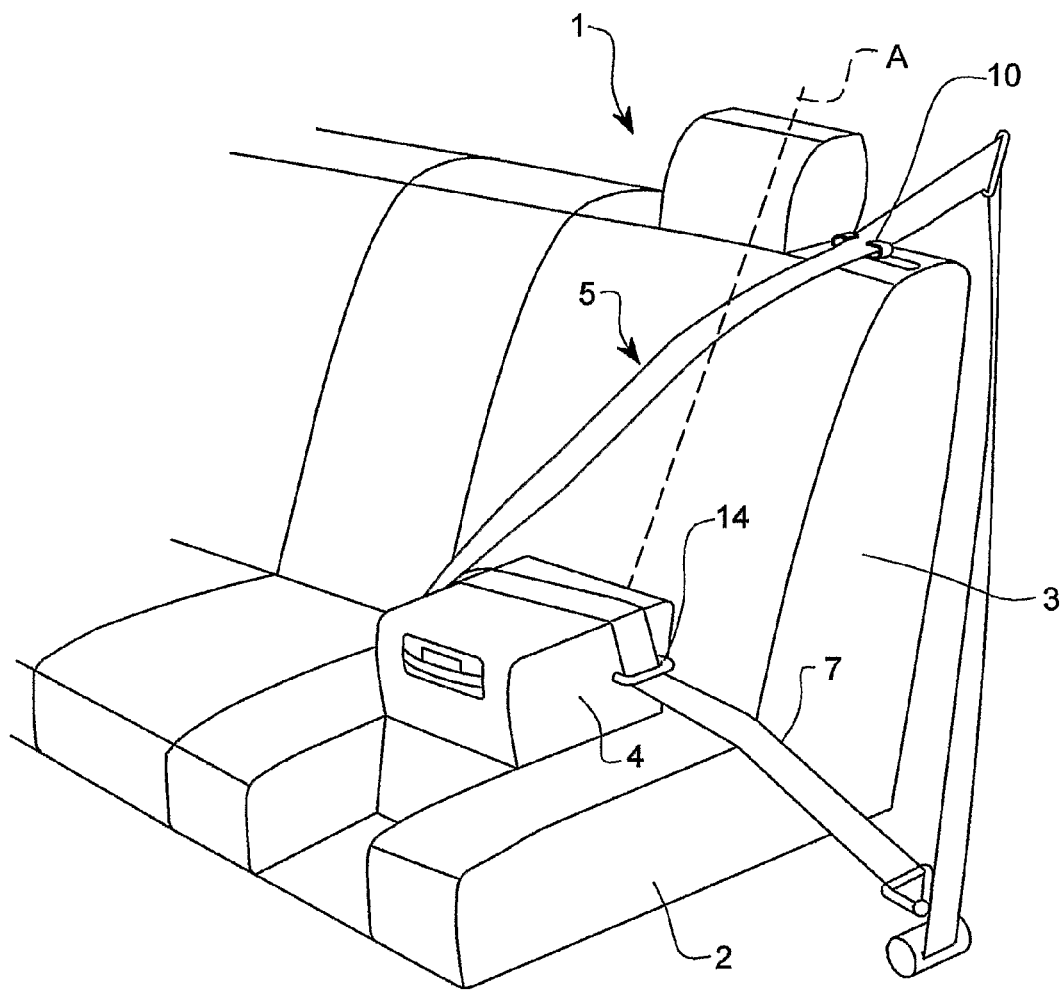
Figure 3:
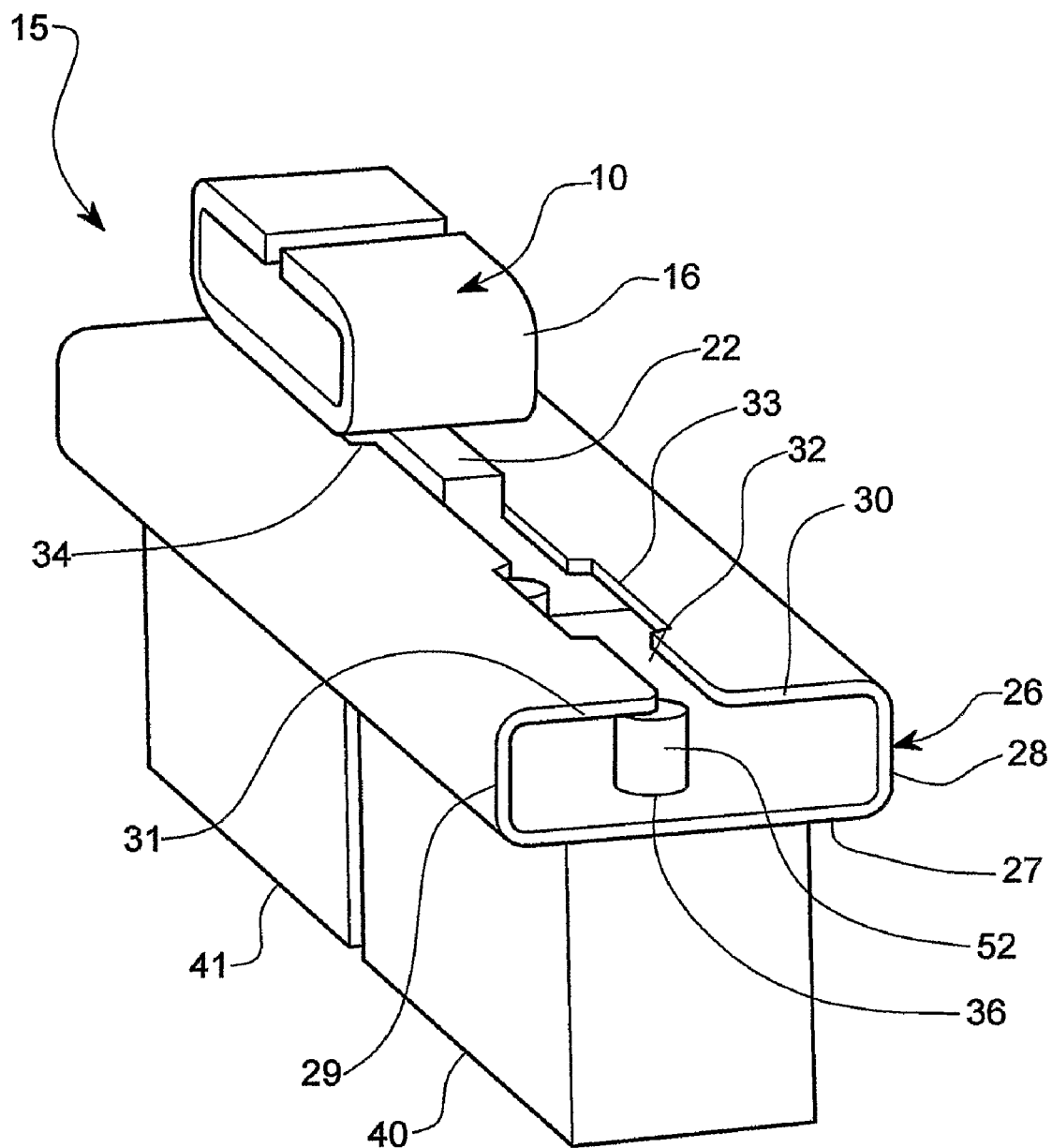
Figure 4:
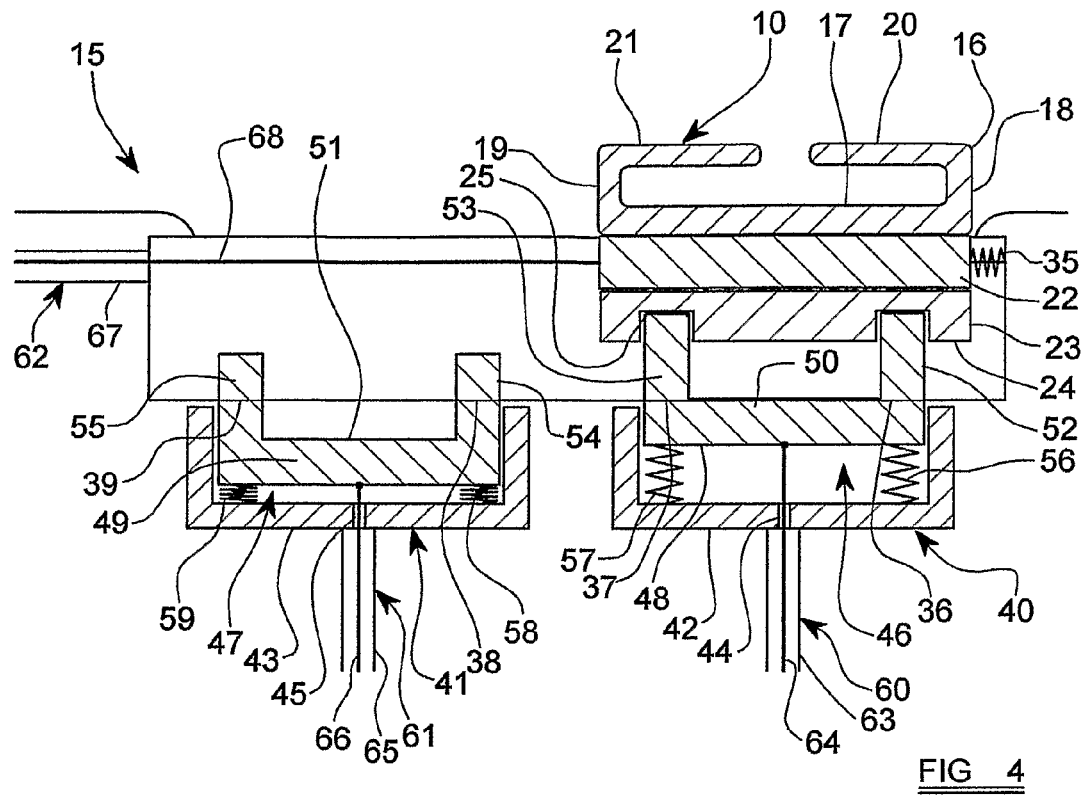
Figure 5:
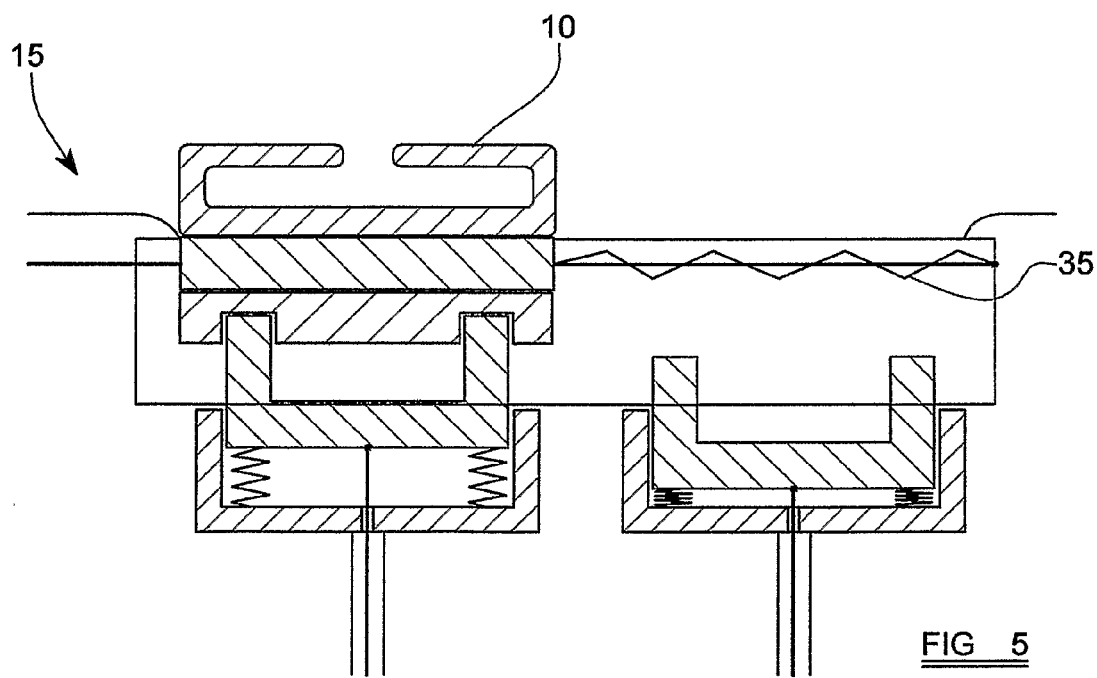
Figure 6:
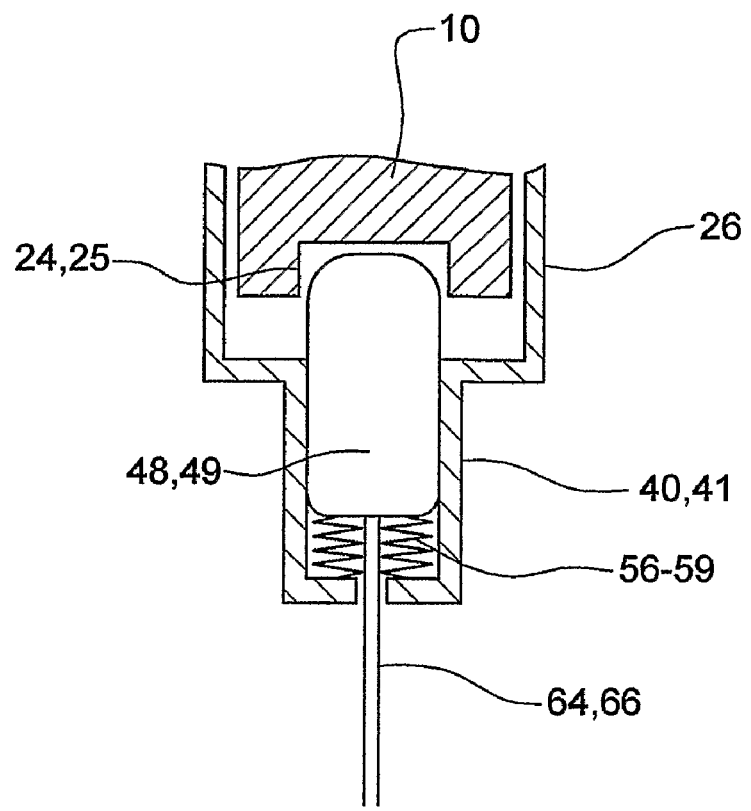
Figure 7:
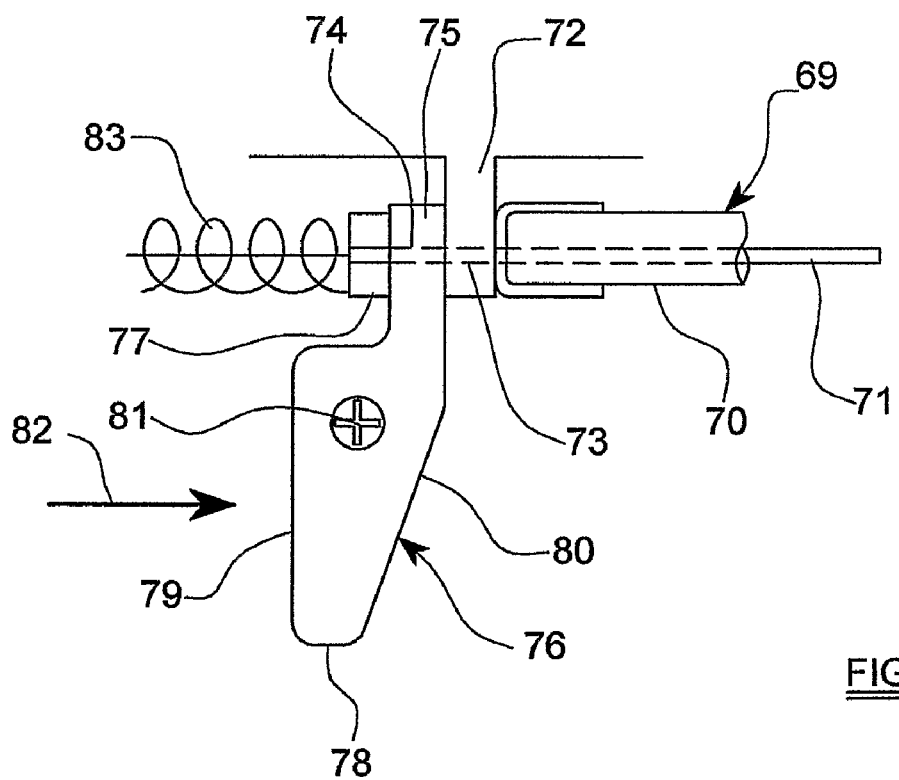
Figure 8:
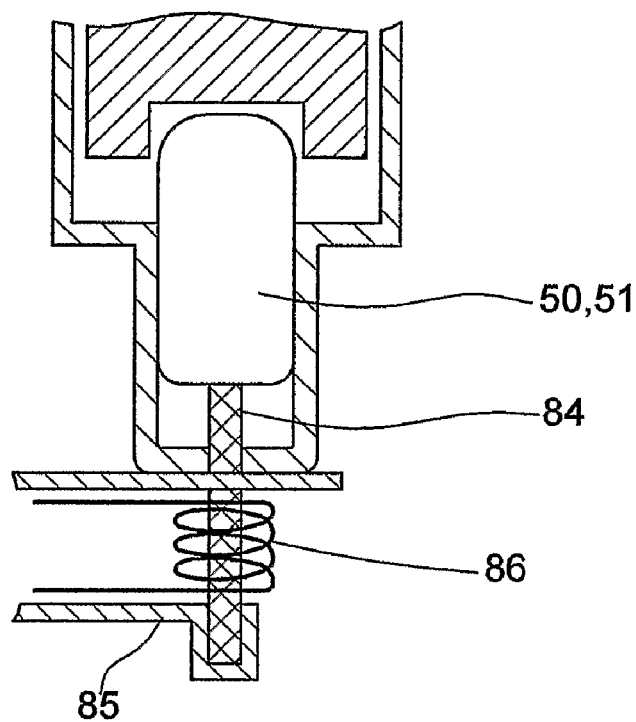
Figure 9:
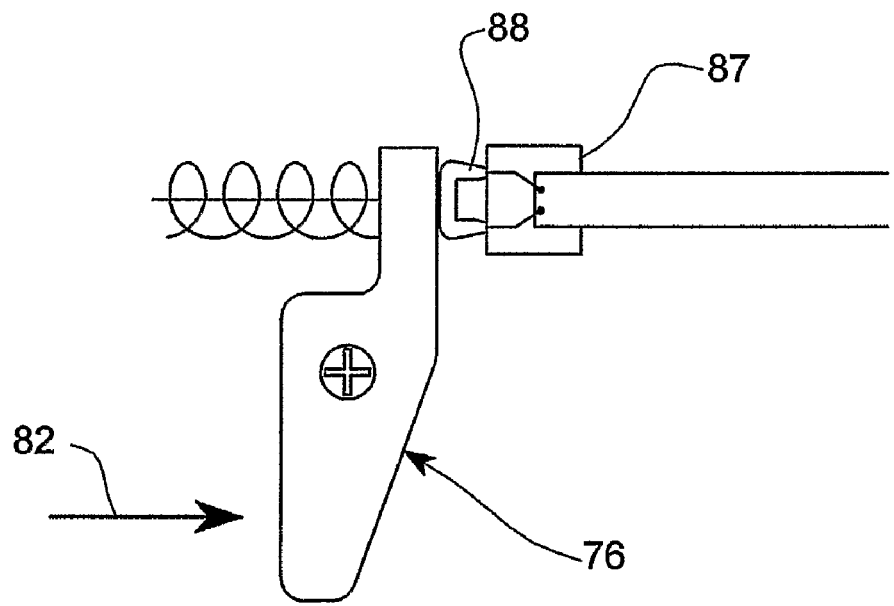
Figure 10:
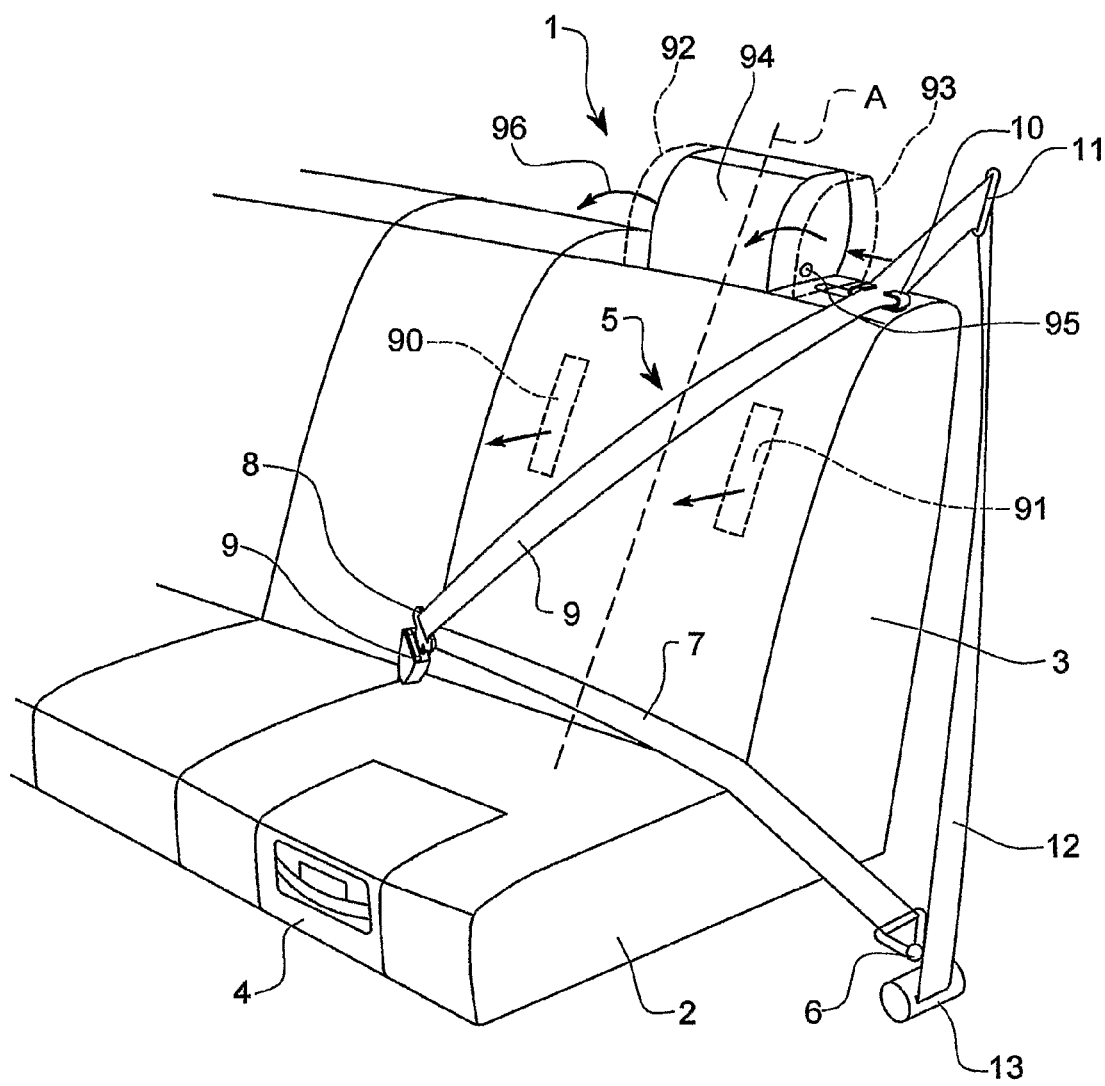
Figure 11:
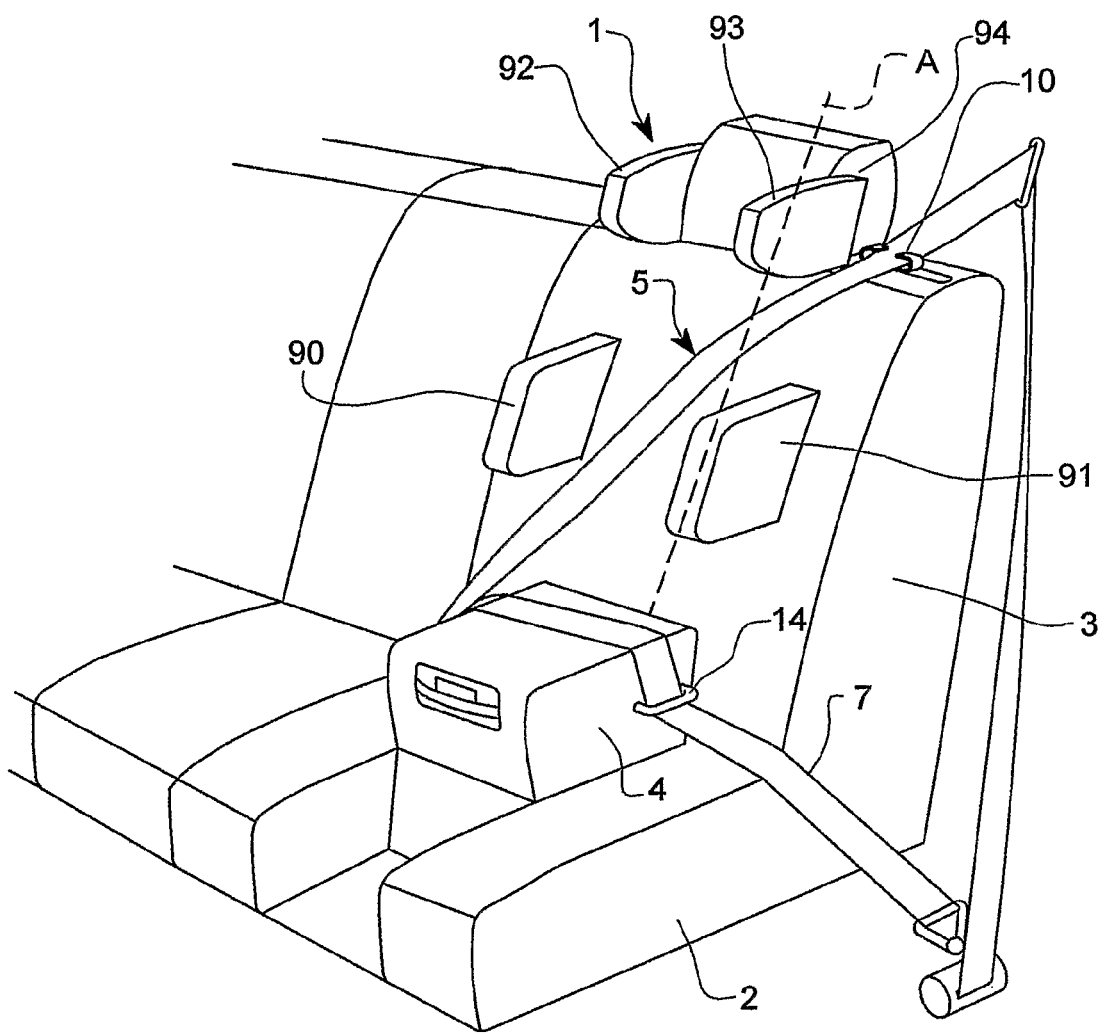

In order that the invention may be more readily understood, and so that further features thereof may be appreciated, the invention will now be described, by way of example, with reference to the accompanying drawing in which:

FIG. 1 is a diagrammatic perspective view of a vehicle seat in accordance with a preferred embodiment of the invention, with a guide element in a first position and an integral child squab in a retracted position so that the seat can be used by an adult, FIG. 2 is a view of the vehicle seat of FIG. 1, with the guide element in a second position and the child squab in an operative position so that the seat can be used by a child, FIG. 3 is a diagrammatic perspective view of a guide arrangement and the guide element, FIG. 4 is a diagrammatic sectional view of the guide arrangement of FIG. 3, with the guide element in a first position, FIG. 5 is a view corresponding to FIG. 4, with the guide element in a second position, FIG. 6 is a diagrammatic sectional view of the guide arrangement shown in FIG. 3, showing a locking arrangement, FIG. 7 is a diagrammatic view of a pivoted lever connected to a control Bowden cable, FIG. 8 is a view corresponding to FIG. 6 of a guide arrangement in accordance with an alternative embodiment of the invention, FIG. 9 is a view corresponding to FIG. 7 of the pivoted lever in accordance with the alternative embodiment of FIG. 9, FIG. 10 is a perspective view of an alternative embodiment of the invention in a first condition, and FIG. 11 is a view of the embodiment of FIG. 10 in a second condition.

Referring initially to FIG. 1 of the accompanying drawings, a vehicle seat 1, in accordance with a preferred embodiment of the invention, has a squab 2 and a backrest 3. The seat 1 incorporates an integrated moveable child supporting squab 4 which, when the seat 1 is to seat an adult, is retracted and forms the upper front part of the squab 2, as shown in FIG. 1.

Vehicle seats which incorporate an integrated moveable child supporting squab are known in the art. An example of a vehicle seat which incorporates an integrated moveable child supporting squab is disclosed in British Patent Publication No. GB 2368272 A.

A three-point safety belt 5 is installed in the vehicle for use by an occupant of the vehicle seat 1. The three-point safety belt 5 is shown in FIG. 1 in an operative, buckled, condition but without an occupant being seated on the seat 1.

The three-point safety belt 5 is a conventional safety belt of the type discussed above. The three-point safety belt 5 is attached at one end by an anchorage 6 to part of the vehicle on one side of the squab 2 and a lap section 7 extends (when the safety belt 5 is in use) to a tongue 8 which is locked into a buckle 9 on the other side of the squab 2. A torso section 9 of the safety belt 5 extends diagonally upwardly from the tongue 8, and through a moveable guide 10 which is moveably mounted to an upper part of the backrest 3 on one side of the central longitudinal axis A of the backrest 3. The torso section 9 then extends diagonally upwardly from the moveable guide 10 to a guide loop 11 which is fixed to the wall of the vehicle. A third section 12 of the safety belt 5 extends down from the guide loop 11 to a retractor 13 which is mounted to the wall or floor of the vehicle below the guide loop 11.

It should be noted that when the vehicle seat 1 is configured to seat an adult, with the moveable child supporting squab 4 retracted into the squab 2 of the seat 1, the moveable guide 10 is in a first position, away from the central longitudinal axis A of the backrest 3, as shown in FIG. 1. An adult can thus seat on the squab 2 of the seat 1 with the moveable guide 10 guiding the torso section 9 of the safety belt 5 over the central part of one of the shoulders of the adult, making the safety belt 5 comfortable to wear and offering optimised protection for the adult.

It is to be understood that the moveable guide 10 forms a lateral restraint element, restraining the part of the safety belt it is instantaneously contained within the guide, preventing lateral movement of that part of the belt, and thus causing the belt to follow a precisely predetermined course.

Referring now to FIG. 2, the seat 1 has been adapted to seat a child by moving the child supporting squab 4 to an operative position, above the rear part of the squab 2 of the seat 1. It should be noted that upon movement of the child supporting squab 4 from the retracted position to the operative position, the moveable guide 10 has moved laterally from the first position to a second position, with the second position being closer to the central longitudinal axis A of the backrest 3 than the first position.

When the moveable guide 10 is in the second position, the moveable guide 10 guides the torso section 9 of the safety belt 5 over the central part of one of the shoulders of the child seated on the child supporting squab 4. A child can thus sit on the child supporting squab 4 with the safety belt 5 being guided over the correct part of the torso of the child, making the safety belt 5 comfortable to wear for the child, whilst offering optimised protection for the child.

After the child supporting squab 4 has been moved to the operative position, the lap section 7 of the safety belt 5 is hooked beneath a hook member 14 which is mounted to one side of the child supporting squab 4. The hook member 14 acts as a guide for the lap section 7 of the safety belt 5 to guide the lap section 7 over the lap of a child seated on the child supporting squab 4, to a position which is close to one side of the child. The hook member 14 thus ensures that the lap section 7 of the safety belt 5 is pulled tight over the lap of the child, to offer optimised protection for the child.

Referring now to FIGS. 3 to 6 of the accompanying drawings, the moveable guide 10 forms part of a guide arrangement 15. The upper part of the moveable guide 10 is defined by a belt guide member 16 which has a generally rectangular planar base 17 with two upstanding walls 18 and 19 that extend upwardly from each end of the planar base 17. Two flanges 20 and 21 are provided, each flange extending inwardly from the upper end of a respective upstanding wall 18, 19, part way across the length of the planar base 17. A gap is formed between the ends of the flanges 20, 21, so that the belt guide member 16 of substantially C-shaped cross-section.

An upstanding section of an inverted T-sectioned support member 22 is attached to the underside of the planar plate 17, to support the belt guide member 16. The support member 22 has a generally rectangular enlarged lower end plate 23, and the rectangular area defined by the enlarged lower end plate 23 is substantially the same as the rectangular area defined by the belt guide member 16.

Two locking recesses 24 and 25 are formed in the lower side of the enlarged lower end plate 23. The purpose of the locking recesses 24,25 will become clear from the following description.

The moveable guide 10 is dimensioned to be inserted into one end of an elongate hollow, open ended C-shaped housing 26. The C-shaped housing 26 has an elongate planar base 27 with upstanding walls 28 and 29 that extend upwardly from the edge of the planar base 27 along the length of the C-shaped housing 26. Elongate flanges 30 and 31 extend inwardly from the upper ends of the upstanding walls 28 and 29, part way across the width of the elongate base 27, with a guide slot 32 being defined between the ends of the elongate flanges 30, 31. The guide slot 32 extends along the entire length of the C-shaped housing 26. The guide slot 32 has enlarged sections 33 and 34 at positions along the C-shaped housing 26 which correspond to the first and second positions of the moveable guide 10.

During assembly of the guide arrangement 15, the enlarged lower end 23 of the moveable guide 10 is inserted into one end of the C-shaped housing 26, with the upstanding section of the T-shaped support member 22 extending through the guide slot 32. The moveable guide 10 is thus held by the C-shaped housing 26, with the T-shaped support member 22 being constrained to move linearly along the guide slot 32. The enlarged lower end 23 of the moveable guide 10 prevents the T-shaped support member 22 from being pulled upwardly, and out from the C-shaped housing 26. The moveable guide 10 is biased towards the first position by a guide biasing spring 35.

Two pairs of spaced apart lock apertures 36, 37 and 38, 39 are formed along the central longitudinal axis of the planar base 27 of the C-shaped housing 26, with each of the lock apertures 36-39 being positioned beneath the guide slot 32. The purpose of the lock apertures 36-39 will become clear from the following description.

Two generally box shaped lock housings 40 and 41 each have an open end which is mounted to the underside of the planar plate 27 of the C-shaped housing 26. Each of the open ends of the lock housings 40 and 41 extends around a respective pair of lock apertures 36, 37 and 38, 39. Each of the lock housings 40 and 41 has a respective generally rectangular base 42, 43, and a relatively small diameter aperture 44, 45 is formed in a central region of each rectangular planar base 42, 43. The purpose of each small diameter aperture 44, 45 will become clear from the description below.

The lock housings 40 and 41 are substantially identical to one another, and each of the lock housings 40, 41 houses a locking arrangement 46, 47 which is substantially identical to a locking arrangement 46, 47 within the other lock housing 40, 41.

Each of the locking arrangements 46, 47 incorporates a substantially U-shaped locking member 48, 49, and each of the locking members 48, 49 incorporates an elongate support bar 50, 51 which is positioned inside a respective lock housing 40, 41. Each of the elongate support bars 50, 51 has an upturned locking pin 52-55 formed integrally at each end of the bar.

The first pair of the lock apertures 36, 37 corresponds to the first pair of locking pins 52, 53, and the first pair of locking pins 52, 53 extends up from the interior of the first lock housing 40 through the first pair of lock apertures 36, 37 and into the interior of the C-shaped housing 26. The second pair of the lock apertures 38, 39 corresponds to the second pair of locking pins 54, 55 and the second pair of locking pins 54, 55 extend up from the second lock housing 41 through the second pair of lock apertures 38, 39 and into the interior of the C-shaped housing 26. Each of the U-shaped locking members 48, 49 is biased upwardly from the interior of their respective lock housing 40, 41 towards the C-shaped housing 26 by a respective pair of biasing springs 56, 57 and 58, 59.

The guide arrangement incorporates three Bowden cables 60, 61 and 62. A first Bowden cable 60 has an outer sheath 63 and an inner wire 64. The inner wire 64 of the first Bowden cable 60 extends into the first lock housing 40 and is attached to the lower side of the U-shaped locking member 48 with the sheath 63 of the cable 60 engaging the housing 40. A second Bowden cable 61 has an outer sheath 65 and an inner wire 66, and the inner wire 66 extends through the second lock housing 41 and is attached to the lower side of the second U-shaped locking member 49 with the sheath 65 of the cable 61 engaging the housing 41. A third Bowden cable 62 has an outer sheath 67 and an inner wire 68. The outer sheath 67 is fixed relative to the C-shaped housing 26, and the inner wire 68 is connected to the moveable guide 10.

The third Bowden cable 62 forms part of a drive arrangement which is connected to the moveable guide 10 to move the guide element from the first position to the second position.

Referring now to FIG. 7, the Bowden cables 60, 61 and 62 are connected to a control mechanism (not shown), and the control mechanism provides a connection between the Bowden cables 60, 61 and 62 and a single control Bowden cable 69. The control Bowden cable 69 has an outer sheath 70 and an inner wire 71. The outer sheath 70 is mounted to a support flange 72, and the inner wire 71 passes through an aperture 73 formed in the support flange 72 and an aperture 74 in an arm 75 of a pivoted lever 76. The end of the inner wire 71 is fastened to the arm 75 by a locking nut or nipple 77.

The pivoted lever 76 comprises a planar plate 78, from which the arm 75 extends upwardly. The planar plate 78 is of generally rectangular shape, but with one end of the planar plate 78 being cut away so that the planar plate 78 presents a vertical edge 79 and an inclined edge 80. The planar plate 78 is pivotally mounted to part of the vehicle by a pivot member 81 at a point close to the upper end of the planar plate 78, below the arm 75. The pivoted lever 76 is mounted such that if a force is exerted on the lower end of the vertical edge 79, as indicated by arrow 82, the pivoted lever 76 will pivot about the pivot member 81 in an anticlockwise direction. The pivoted lever 76 is biased in a clockwise direction by a coil spring 83, such that the force applied in the direction of arrow 82 must be in excess of a predetermined level, dependent upon the coil spring 83, in order to pivot the pivoted lever 76. As the pivoted lever 76 pivots, the arm 75 is moved away from the support flange 72, pulling the inner wire 71 through the support flange 72 and out from the outer sheath 70 of the control Bowden cable 69.

When the vehicle seat 1 is to accommodate an adult, the child supporting squab 4 is retracted into the front part of the squab 2, as shown in FIG. 1. However, if the vehicle seat 1 is to accommodate a child the child supporting squab 4 is moved to the operative position by actuating a movement mechanism (not shown). When the movement mechanism is actuated, the lever 76 is engaged and moved to pull the wire 71 of the control Bowden cable 69. In response to this the control mechanism pulls the first inner wire 64 of the first Bowden cable 60, causing the first U-shaped locking member 48 to be moved downwardly, against the bias of the springs 56, 57. As the U-shaped locking member 48 is moved downwardly, the locking pins 52, 53 are moved out from the locking recesses 24, 25 in the moveable guide 10. After the locking pins 52, 53 have been moved out from the locking recesses 24, 25, the control mechanism pulls the inner wire 68 of the third Bowden cable 62 which pulls the moveable guide 10 along the guide slot 32 to the second position, in which the moveable guide 10 is positioned over the second locking arrangement 47.

When the moveable guide 10 is positioned over the second locking arrangement 47, the control mechanism releases the inner wire 66 of the second Bowden cable 61 to allow the second U-shaped locking member 49 to move upwardly under influence of the bias of the springs 58, 59. The locking pins 54, 55 are thus moved into the locking recesses 24, 25 to lock the moveable guide 10 in the second position, as shown in FIG. 5.

Thus, it will be appreciated that the moveable guide 10 is moved by a drive arrangement from the first position to the second position in response to the child supporting squab 4 being moved from the retracted position to an operative position to provide the child supporting squab 4 in a position to accommodate a child.

If, subsequently, the vehicle seat 1 is to accommodate an adult, the movement mechanism is actuated, to pull the inner wire 66 of the second Bowden cable 61, moving the second U-shaped locking member 49 downwardly, and hence moving the locking pins 54, 55 out from the locking recesses 24, 25. The inner wire 68 of the third Bowden cable 62 is subsequently released by the control mechanism. The moveable guide 10 is thus free to move from the second position back to the first position under the force exerted by the biasing spring 35 when the third Bowden cable 62 is released by the control mechanism. Once the moveable guide 10 has moved back to the first position the inner wire 64 of the first Bowden cable 60 is released by the control mechanism and the first U-shaped locking member 48 moves upwardly under a biasing force exerted by the springs 56, 57 so that the locking pins 52, 53 move into the locking recesses 24, 25.

Referring now to FIGS. 8 and 9, an alternative embodiment of the invention utilises an electronic system to move the U-shaped locking members 48 and 49, to unlock the moveable guide 10. In this alternative embodiment, the first and second Bowden cables 60 and 61 are replaced by armatures 84 which are each mounted to the underside of a respective U-shaped locking member 48, 49. Each choke 84 passes through the small diameter aperture 44, 45 in the base of the lock housing 40, 41, and each of the armatures 84 is biased upwardly, towards the moveable guide 10 by a resilient biasing strip 85. A solenoid coil 86 is loosely wound around part of each of the armatures 84, where each armature 84 passes through their respective small diameter aperture 44, 45, 43. Each solenoid coil 86 is connected by wires to a circuit 87 which is positioned adjacent a pivoted lever 76 of the same configuration as the pivoted lever 76 of the preferred embodiment described above. The electrical circuit 87 incorporates a sensor 88 which senses the presence of the arm 75 of the pivoted lever 76.

In this alternative embodiment, when a user moves the child supporting squab 4 from the retracted position to the operative position, the movement mechanism pivots the pivoted lever 76 which moves the arm 75 away from the sensor 88. The sensor 88 provides a signal to the electronic circuit 87 and the electronic circuit 87 passes a current through one of the solenoid coils 86. The current flowing through the solenoid coil 86 creates a magnetic field which pulls the armature 84 of the first locking arrangement downwardly, to pull the locking pins 52, 53 out from the locking recesses 24, 25. A reader skilled in the art will appreciate that the armature 84 pulling the U-shaped locking member 48 downwardly is analogous to the inner wire 64 of the first Bowden cable 60 pulling the locking member 48 downwardly.

A further solenoid, or motor drive, may be provided to move the moveable guide 10 between its two positions.

Once each U-shaped locking member 48, 49 has been moved to unlock the moveable guide 10 and after the moveable guide moved, the locking member 48, 49 is subsequently moved back to a locking position by a force exerted by the corresponding biasing springs 56-59. Thus, a reader skilled in the art will appreciate that the resilient biasing strip 85 is analogous to a pair of the biasing springs 56, 57 or 58, 59.

Thus, a reader skilled in the art will appreciate that the mechanical arrangement involving the first and second Bowden cables 60, 61 can be replaced with a system which uses solenoids to provide the same control for locking and unlocking the moveable guide 10.

It is to be appreciated that in the embodiment described above a single restraint element, in the form of the moveable safety belt guide 10 is provided mounted on the seat back and moveable relative to the seat back in response to the seat being provided with a child squab to accommodate a child.

FIGS. 10 and 11 illustrate a modified embodiment of the invention. In FIGS. 10 and 11 many of the illustrated components correspond with components of the above described embodiments. These components will be identified using the same reference numerals and these components will not be redescribed at this time.

It is to be appreciated, from FIGS. 10 and 11, that the embodiment of the invention now described incorporates a vehicle seat 1 having all of the features present in the embodiments of FIGS. 1 to 9. However, the seat is provided with additional lateral restraint elements in the form of two restraint elements 90,91 which are initially mounted in a retracted position within the backrest 3 of the seat 1, and two further restraint elements 92,93 which are initially mounted in position adjacent the ends of the headrest 94 provided at the top of the backrest 3 of the seat. The restraint elements 90,91 are provided with a drive arrangement to drive the restraint elements from an initial retracted position, as shown in FIG. 10, in which the restraint elements do not project at all from the backrest of the seat to an operative position, as shown in FIG. 11, in which the restraints extend forwardly of the backrest of the seat. Each restraint is in the form of a vertical panel, the vertical panels being located to respective sides of the child squab 4, and being positioned so as to provide lateral restraint for the torso of a child sitting on the child squab.

Similarly the restraint element 92,93 associated with the headrest of the seat mounted for forward movement, the restraints, in this case, being mounted for pivotal movement about a pivot axis 95 located adjacent a forward lower part of the headrest. The restraint elements can therefore pivot forwardly, as indicated by the arrows 96, until the restraint elements occupy the position illustrated in FIG. 11. The restraint elements 92,93 then project forwardly, one on either side of the headrest 94, the restraint elements being positioned to provide lateral restraint for the head of a child sitting on the child squab 4.

The restraint elements are each provided with an appropriate drive arrangement which is connected to the restraint element to move the restraint element from a first retracted or non-deployed position, as shown in FIG. 10 to an extended or operative position, as shown in FIG. 11, in response to a seat being provided with a child squab to accommodate a child. The drive arrangement may be a wire linkage system incorporating a Bowden cable, which may be very closely associated with the Bowden cable arrangement provided to move the belt guide 10. Alternatively, the drive arrangement may incorporate electrically actuable components such as solenoids or motors to drive the retaining elements from their first retracted position to their second extended or deployed position. Each restraint 90,91,92,93 may be provided with a locking member to lock it in the first position in the second position.

It is to be understood that whilst, in the embodiment described with reference to FIGS. 10 and 11, in response to the provision of the child squab the seat belt guide 10 effects a movement, and each of the retainer elements effects a movement, in a simpler embodiment of the invention a lesser number of moveable elements may be provided. Thus, it is conceivable that in a very simple embodiment of the invention only one lateral restraint element will be provided moveable from a retracted position to an extended position.

Whilst, in the embodiments described above the vehicle seat 1 has been a seat with an integrated moveable child supporting squab 4, the vehicle seat 1 may alternatively be a standard vehicle seat, which does not incorporate an integrated moveable child supporting squab. In this case, a separate child squab may be provided on the squab 2 of the seat as a booster cushion to accommodate a child. In this case, the seat could be fitted with a sensor which senses the presence of a separate child supporting squab on the squab of the seat, with the sensor providing a signal to the drive arrangement to move the moveable lateral restraint or restraints 10 from the first position to the second position upon the seat being provided with the separate child supporting squab.

A reader skilled in the art will appreciate that a sensor for sensing the presence of a separate child supporting squab on a seat may take several forms. For instance, a Hall effect sensor could be installed within the squab 2 of the seat 1 to detect the presence of a magnet in the separate child supporting squab 4 when the child supporting squab 4 is placed on the squab 2 of the seat 1. Alternatively, the seat may be provided with a mechanical arrangement, whereby a member on the separate child supporting squab presses a mechanical arrangement within the seat and the mechanical arrangement actuates the drive arrangement to move the moveable guide 10 from the first position to the second position. Thus a member on the separate child supporting squab 4 may engage a lever equivalent to the lever 76.

When used in this Specification and Claims, the terms "comprises" and "comprising" and variations thereof mean that the specified features, steps or integers are included. The terms are not to be interpreted to exclude the presence of other features, steps or components.

The invention claimed is:

1. A vehicle seat comprising:
    a squab including a reduced area portion for supporting a child, the squab operative in a first state in which the reduced area portion is in a raised position raised from a remainder of the squab for supporting the child and a second state in which the reduced area portion is in a lowered position generally flush with the remainder of the squab for supporting an adult;
    a backrest mounted to a back portion of the squab;
    at least one restraint element including a safety belt guide element, the safety belt guide element moveably mounted relative to the backrest and to one side of a central, longitudinal axis of an upper part of the backrest of the seat to guide a safety belt over a shoulder of an occupant of the seat, the safety belt guide element moveable between a first position and a second position that is closer to the central, longitudinal axis of the back rest than the first position; and
    a drive arrangement connected to the at least one restraint element to automatically move the element from the first position to the second position in response to movement of the reduced area portion from the lowered position to the raised position.

2. The vehicle seat according to claim 1, wherein the reduced area portion is formed integrally with the vehicle seat.

3. The vehicle seat according to claim 2, wherein the drive arrangement moves the at least one restraint element in response to movement of the squab between the first state and the second state.

4. The vehicle seat according to claim 1, wherein the drive arrangement is responsive to a separate child squab being provided on the seat as a booster cushion to accommodate the child.

5. The vehicle seat according to claim 4, wherein the seat incorporates a sensor which senses the presence of the child squab on the squab of the seat, the sensor being configured to actuate the drive arrangement.

6. The vehicle seat according to claim 1, wherein the at least one restraint element is moveable by a wire linkage system incorporating at least one Bowden cable which forms at least part of the drive arrangement.

7. The vehicle seat according to claim 1, wherein the at least one restraint element is moveable by a drive arrangement including at least one electrically actuable element.

8. The vehicle seat according to claim 1, wherein the at least one restraint element is moveable by a drive arrangement including at least one electric motor.

9. The vehicle seat according to claim 1, wherein the at least one restraint element includes a first restraint element moveable from the first position in which the first restraint element is accommodated within the backrest of the seat, to a second position in which the first restraint element projects from the backrest of the seat, the first restraint element being positioned to one side of the reduced area portion.

10. The vehicle seat according to claim 9, wherein the at least one restraint element includes two restraint elements accommodated within the backrest of the seat positioned on respective sides of the reduced area portion.

11. The vehicle seat according to claim 1, wherein the at least one restraint element comprises at least one head restraint moveably mounted to a headrest of the seat and moveable from a retracted position to an extended position in which the head restraint extends forwardly of a central part of the headrest of the seat.

12. The vehicle seat according to claim 11, wherein the at least one head restraint includes two head restraints, there being a respective one on each side of the headrest.

13. The vehicle seat according to claim 1, wherein the at least one restraint element is associated with a first locking arrangement having a first locking member for locking the at least one restraint element in the first position and a second locking arrangement having a second locking member for locking the restraint element in the second position.

14. A vehicle seat comprising:
a squab having an integrated child squab operable between a raised position and a lowered position;
a backrest coupled to a rear portion of the squab;
a seatbelt restraint element moveable between a first position and a second position, the first position being disposed farther from a central, longitudinal axis of the backrest than the second position; and
a movement mechanism in communication with the child squab and the seatbelt restraint element and operable to move the seatbelt restraint element to the second position when the child squab is in the raised position and to the first position when the child squab is in the lowered position.

15. The vehicle seat according to claim 14, wherein the movement mechanism incorporates at least one of a wire linkage system, an electrically actuable element, and an electric motor.

16. The vehicle seat according to claim 14, further comprising at least one extendable restraint element accommodated within at least one of a headrest of the seat and the backrest of the seat.

17. A vehicle seat comprising:
a squab including a child squab moveable between a retracted position adjacent to the squab and a use position extending from the squab;
a backrest interconnected with a back portion of the squab; and
a guide member retaining a seat belt and automatically moveable from a first position to a second position in response to movement of the child squab from the stowed position to the use position, the second position being closer to a central, longitudinal axis of the backrest.

18. The vehicle seat according to claim 17, wherein the guide member moves along a longitudinal axis between the first position and the second position.

19. The vehicle seat according to claim 17, wherein the squab incorporates a sensor for sensing the presence of a discrete child seat, the sensor being configured to actuate the belt guide member into the second position if the discrete child seat is disposed on the squab and the child squab is in the retracted position.

* * * * *